(12) United States Patent
Locatelli et al.

(10) Patent No.: US 10,830,537 B2
(45) Date of Patent: Nov. 10, 2020

(54) EQUIPMENT FOR MEASUREMENT AND CONTROL OF LOAD MATERIAL FED INTO A FURNACE

(71) Applicants: Dario Locatelli, Milan (IT); Silvio Maria Reali, Milan (IT); Paolo Argenta, Milan (IT)

(72) Inventors: Dario Locatelli, Milan (IT); Silvio Maria Reali, Milan (IT); Paolo Argenta, Milan (IT)

(73) Assignee: TENOVA S.p.A., Milan (IT)

(*) Notice: Subject to any disclaimer, the term of this patent is extended or adjusted under 35 U.S.C. 154(b) by 185 days.

(21) Appl. No.: 16/049,875

(22) Filed: Jul. 31, 2018

(65) Prior Publication Data
US 2018/0347908 A1 Dec. 6, 2018

Related U.S. Application Data

(63) Continuation-in-part of application No. 14/882,398, filed on Oct. 13, 2015, now Pat. No. 10,060,677, (Continued)

(30) Foreign Application Priority Data

Apr. 13, 2005 (IT) .............................. MI2005A0626

(51) Int. Cl.
*F27D 13/00* (2006.01)
*F27D 3/00* (2006.01)
(Continued)

(52) U.S. Cl.
CPC .......... *F27D 21/0035* (2013.01); *C21B 13/12* (2013.01); *C21C 5/527* (2013.01);
(Continued)

(58) Field of Classification Search
CPC ......... C21C 5/527; C21C 5/565; C21C 5/567; C21C 5/5294; C21C 2005/5288;
(Continued)

(56) References Cited

U.S. PATENT DOCUMENTS 3,917,241 A * 11/1975 Steffora ................. B22D 11/10
373/115
4,641,319 A * 2/1987 Nagai .................... B22D 39/04
373/84

(Continued)

*Primary Examiner* — Hung D Nguyen
(74) *Attorney, Agent, or Firm* — Themis Law

(57) ABSTRACT

A system and equipment to measure and control the feeding of load material into an electrical arc furnace (EAF) includes an automatic control device feeding the load material; a measuring device positioned between the EAF and the tilting platform that includes an upper plate adapted to slide against the EAF, a lower plate engaged to the tilting platform, and a ring structure therebetween having a peripheral ring wall, a ring plate extending across the ring structure, and a contact member coupled to the ring plate that upperly contacts the upper plate and lowerly approaches, without contacting the lower plate; and one or more sensors measuring a deformation of the ring plate upon application of a load on the upper plate.

19 Claims, 9 Drawing Sheets

Related U.S. Application Data which is a continuation of application No. 11/887,871, filed as application No. PCT/EP2006/003529 on Apr. 7, 2006, now Pat. No. 9,170,050.

(51) Int. Cl.

| | | |
|---|---|---|
| *F27D 21/00* | (2006.01) | |
| *F27D 19/00* | (2006.01) | |
| *C21B 13/12* | (2006.01) | |
| *F27B 7/28* | (2006.01) | |
| *F27B 3/28* | (2006.01) | |
| *F27B 3/18* | (2006.01) | |
| *C21C 5/56* | (2006.01) | |
| *C21C 5/52* | (2006.01) | |
| *F27D 3/14* | (2006.01) | |

(52) U.S. Cl.
CPC ............. *C21C 5/567* (2013.01); *F27B 3/183* (2013.01); *F27B 3/28* (2013.01); *F27B 7/28* (2013.01); *F27D 3/0024* (2013.01); *F27D 3/0025* (2013.01); *F27D 19/00* (2013.01); *C21C 2005/5288* (2013.01); *C21C 2300/02* (2013.01); *C21C 2300/06* (2013.01); *F27D 2019/0075* (2013.01); *Y02P 10/20* (2015.11); *Y02W 30/50* (2015.05)

(58) Field of Classification Search
CPC ...... C21C 2300/02; F27B 3/065; F27B 3/085; F27B 3/10; F27B 3/12; F27B 3/18; F27B 3/183; F27B 3/19; F27B 3/24; F27B 3/28; F27B 7/28; F27D 2019/0075; F27D 3/0024; F27D 3/0025; F27D 3/1509; F27D 19/00; F27D 21/0035; C21B 13/12; Y02W 30/54; Y02P 10/216
USPC ..... 373/2, 79, 80, 81, 82, 84, 104, 109, 115, 373/122, 138, 142, 151, 156, 159, 163; 266/79, 88, 99; 75/10.63, 10.66
See application file for complete search history.

(56) References Cited

U.S. PATENT DOCUMENTS

2002/0071473 A1\* 6/2002 Stercho .................... F27B 3/10
 373/79
2002/0110175 A1\* 8/2002 Stercho ................ C21C 5/5294
 373/79

\* cited by examiner

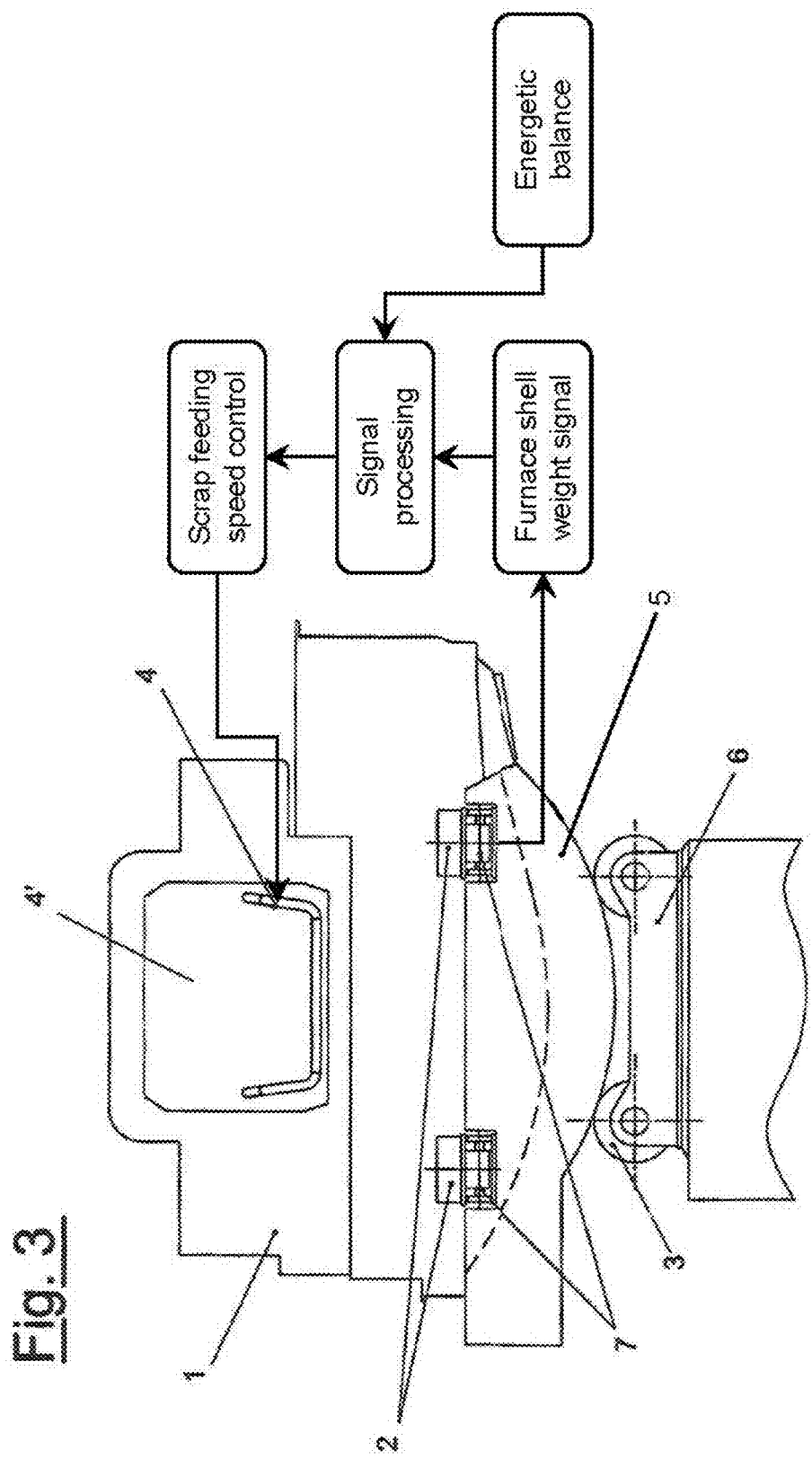

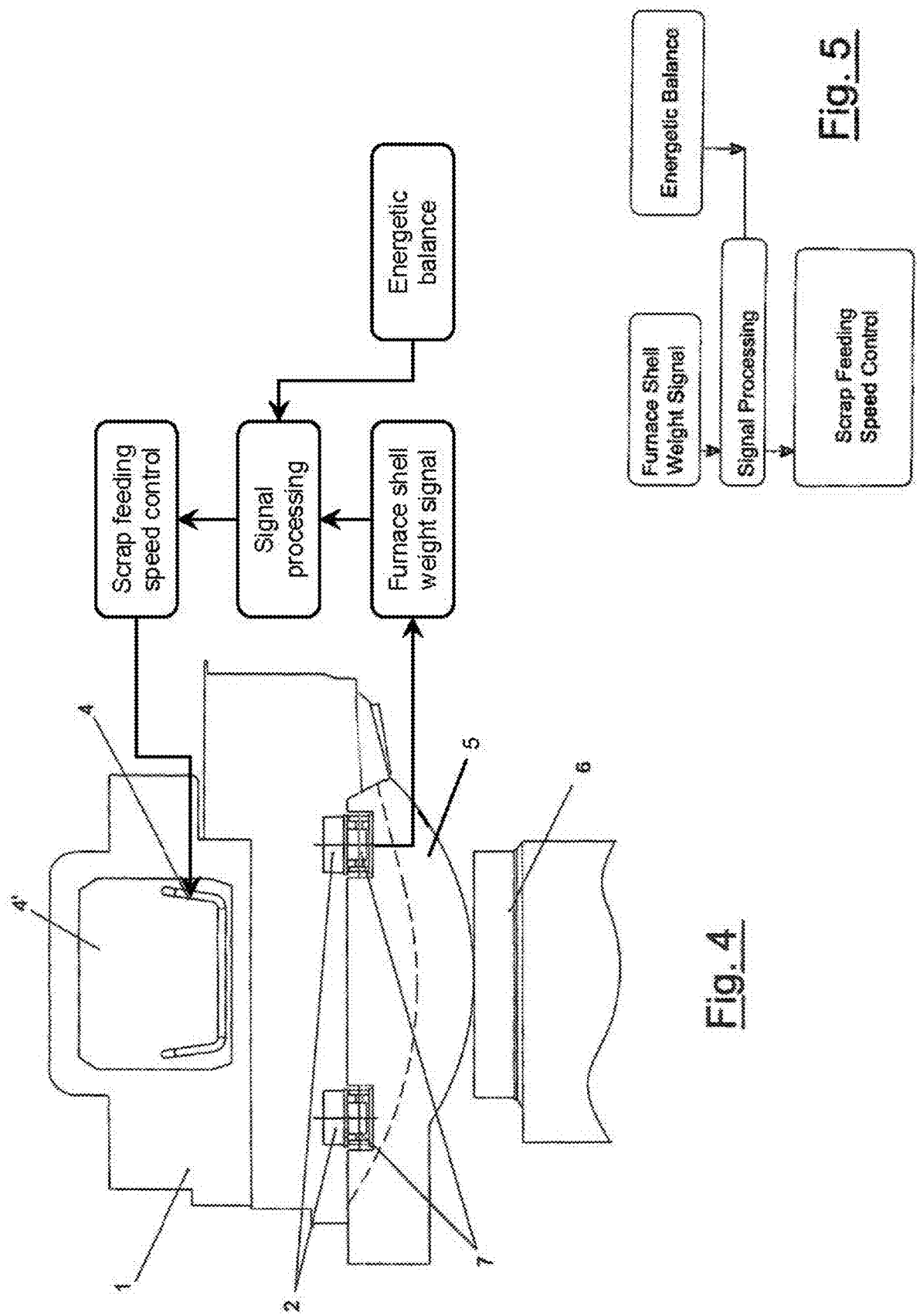

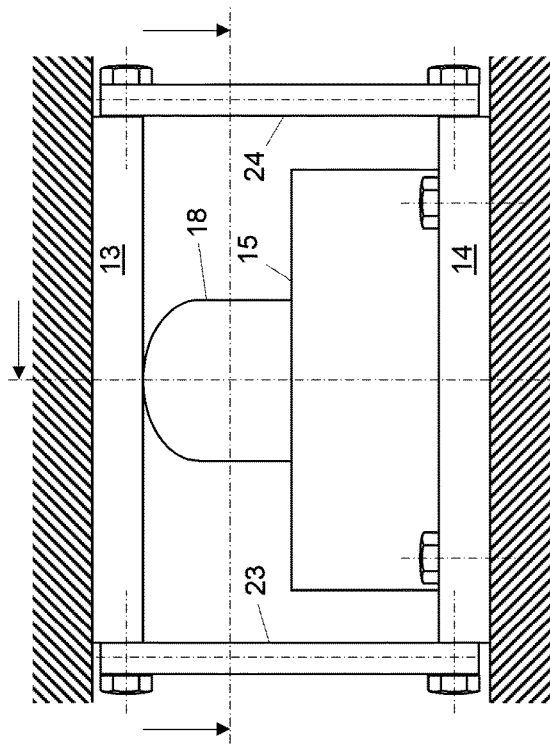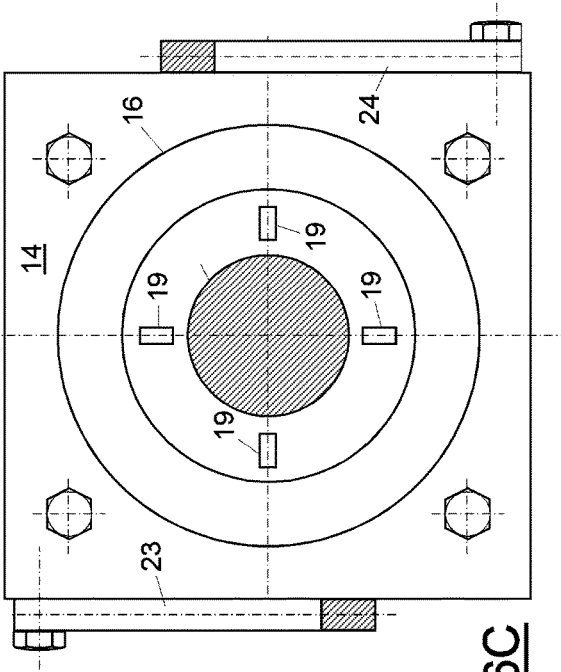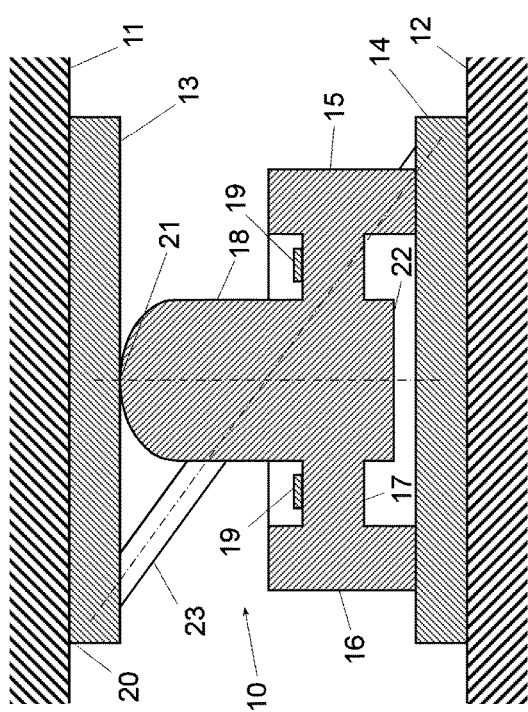

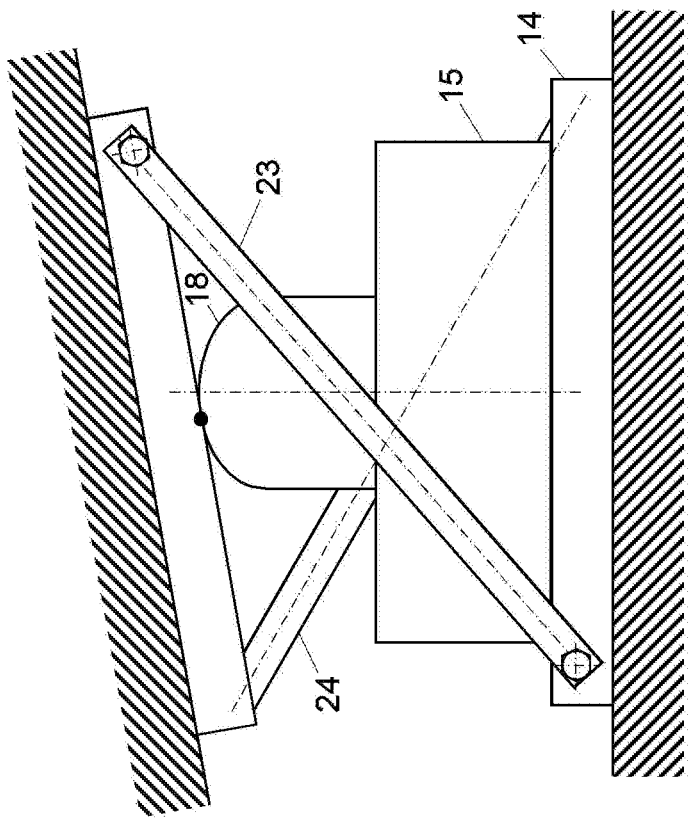
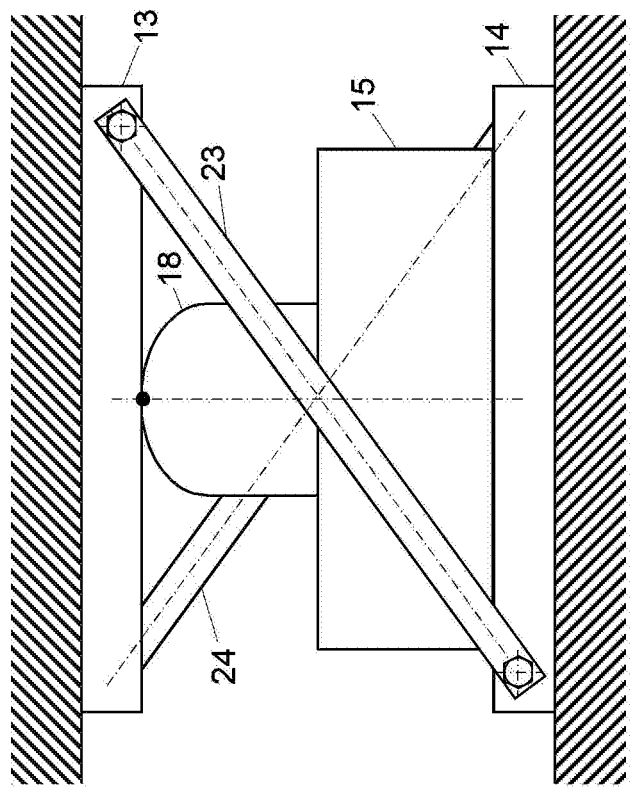

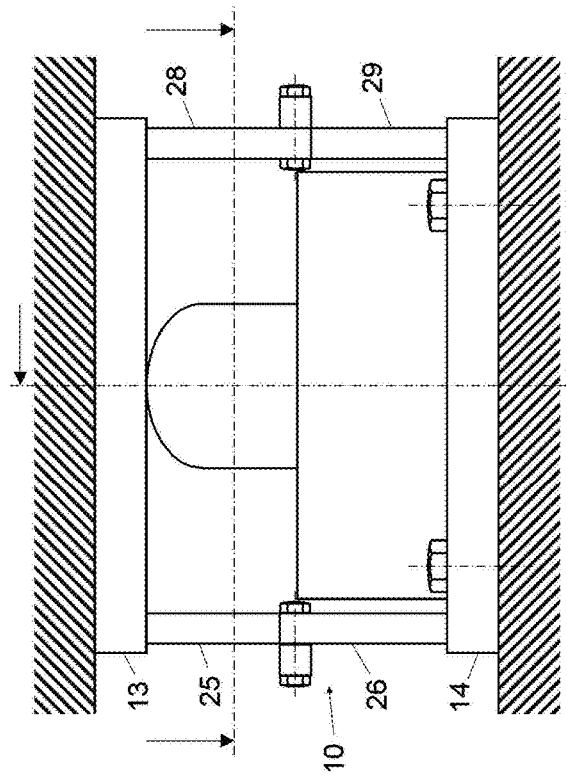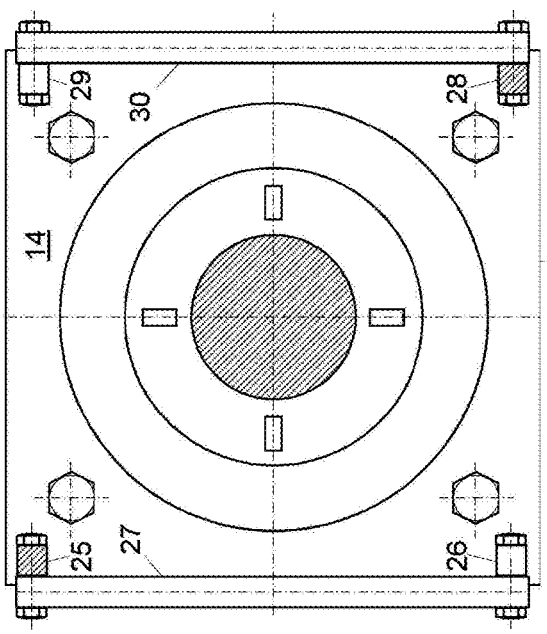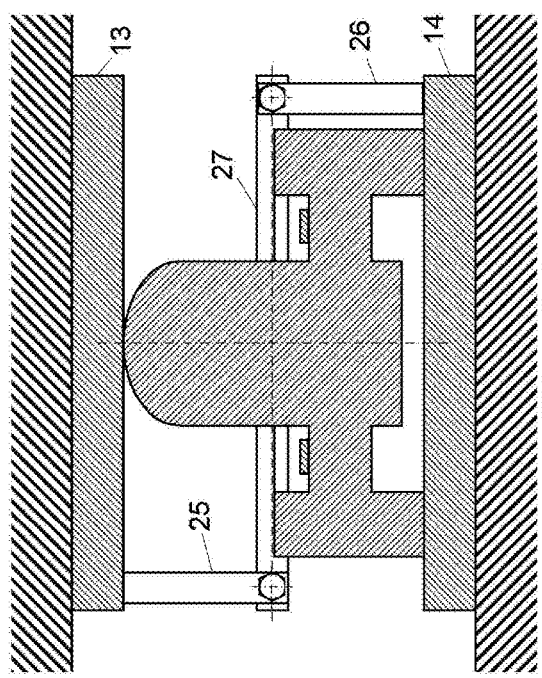

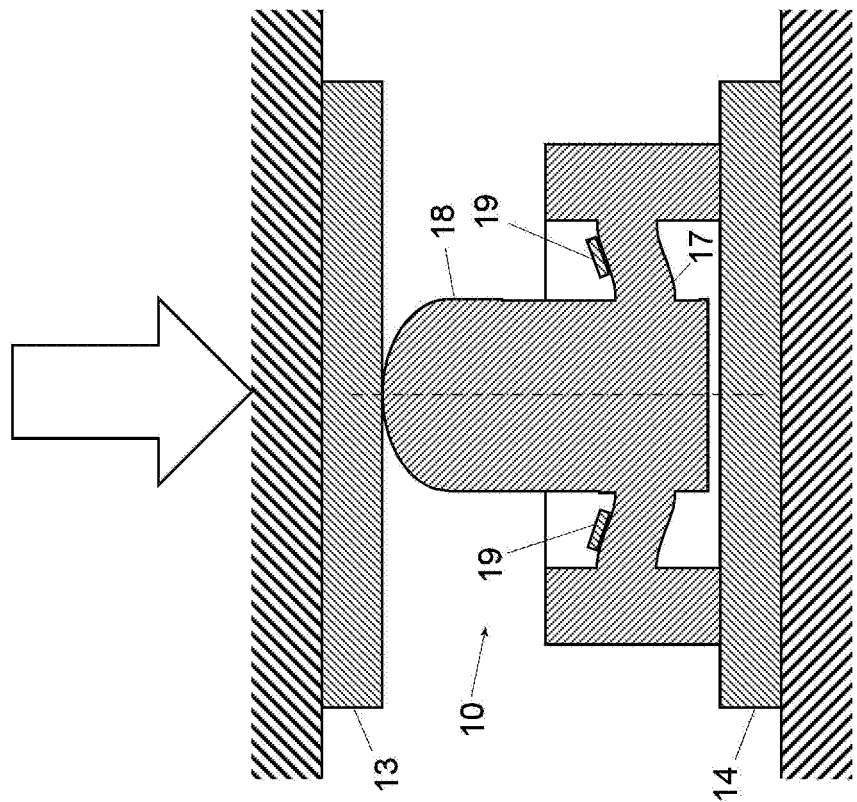
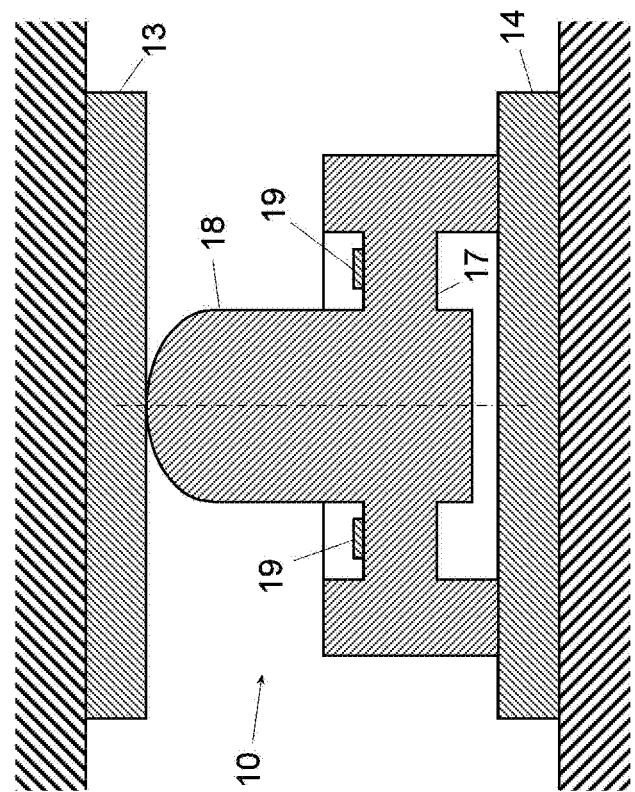

EQUIPMENT FOR MEASUREMENT AND CONTROL OF LOAD MATERIAL FED INTO A FURNACE

FIELD OF THE INVENTION

The present invention relates to equipment for the measurement and control of feeding load material and scrap into a furnace and the relative method, in particular for the measuring and control of continuous feeding.

BACKGROUND OF THE INVENTION

The use of continuous systems for loading scrap metal into a furnace, in particular in an electric arc furnace (EAF) for steel production, systems such as Consteel® for example, and/or the addition of previously reduced material to the bath, involves the need for maintaining direct control of the load material flow as it enters the furnace.

In fact, if the continuous addition of load material in solid state is not continuously and correctly controlled, this can cause problems that reduce the overall efficiency of the productive cycle. Among these problems, the most important is the formation of thickened solid material in the scrap unloading zone in the furnace, as it maintains this consistence for a long period of time, thus prolonging the smelting time in the furnace, and as a result, prolonging the whole productive cycle.

This control is equally as important in order to guarantee that the electrical power supply to the electrodes is as homogeneous as possible, also avoiding direct contact between solid material and the electrodes, a contact that could cause the rupture of the electrodes.

In normal practice, said control is performed by an operator, the line controller, who manually regulates the scrap loading system speed according to his personal experience and his impression of the amount of load material or scrap loaded in the furnace. Naturally this operator must be extremely familiar with the process and the installation, and in any case his decisions can still always be affected by uncertain and not very reliable data reading.

One solution for resolving these problems was to provide for the inclusion of continuous furnace shell weight control means.

To achieve this aim, two types of measurement were developed: an indirect furnace shell weight control method based on the level of the liquid metal, and a more direct control method based on sensors that measure the system weight.

The indirect control method is based on geometric methods which, beginning with a reading of the liquid level, convert this data to volume data (and therefore weight), a conversion that clearly depends on the presumed profile of the refractory tank inside the furnace shell.

However, the furnace shell profile is strictly linked with erosive phenomena that the liquid metal provokes in the refractory, phenomena, which are often violent and unpredictable. Inevitably with time, this causes a lack of precision in the taring curve used to compare the level reading and the volume calculation. Considering said lack of precision and the high specific weight of iron, the measured data will reveal quite a large error, and therefore this technique cannot be used for precision control.

In the case of the direct control method, a method that is based on a direct weighing of the furnace shell structure, the weight reading systems must be located in specific zones such as support uprights and beams, which however, support not only the weight of the furnace shell, but also all the support structures, systems and sub systems of the furnace. Therefore the amount of the load material or scrap metal included constitutes only a limited percentage fraction of the measured weight, and this involves all the various aspects of lack of precision. This lack of precision becomes so great that any measurements performed can be considered reliable only as far as quality is concerned.

In the case of wheel mounted tilting furnaces (and with the weighing system on the wheels), it is the weight of the furnace shell tilting system that must be able to resist strong mechanical stress, to raise the total read weight sacrificing measurement precision.

SUMMARY OF THE INVENTION

The general aim of the present invention is therefore to resolve the aforesaid problems in a simple, economical and particularly functional manner.

It is an object of the present invention an equipment for measuring and controlling load material or scrap metal feeding into an electric arc furnace, having an automatic device to control load material or scrap metal feeding according to the energy supplied to the bath, plus a device for measuring the amount of added load material, in correlation with the automatic control device, comprising a device to weigh the furnace shell, its contents and any other components it may support.

It is another object of the present invention to provide a method for measuring and controlling the feeding of the load material or scrap metal into an electric arc furnace that includes the following steps:

weighing of the load material or scrap metal added to the bath, performed by a device that weighs the furnace shell, its contents and any other components it may support;

data acquisition of a measurement reading of the amount of load material or scrap metal added to the bath, supplied by the weighing device, said reading being differential over a period of time for example;

optimizing the load flow according to suitable algorithms, obtained by adjusting the feeding speed of the load material or scrap metal according to the energy supplied to the bath;

Preferably, the feeding of the load material or scrap metal into an electric arc furnace should be continuous.

In particular, a device to measure the weight of the furnace shell and of any other components it may support provides for a support structure for the furnace shell composed of support rollers.

The function of such rollers is to recover any deviation in shape induced by the heat cycle.

Furthermore the weighing device operates with dual redundancy, at least on two of the support rollers that comprise the measuring rollers. Therefore, preferably at least two support rollers mounted on the equipment according to the present invention act as measuring rollers.

The measuring rollers are equipped with sensors for direct or indirect weight reading.

A third support roller can also act as a measuring roller equipped with sensors for direct or indirect weight reading.

Another device according to the invention to measure the weight of the shell is configured to be positioned between the electric arc furnace (EAF) and the tilting platform and includes an upper plate having an upper surface adapted to slide against a lower surface of the EAF, a lower plate having a lower surface configured to be engaged to the tilting platform, a ring structure coupled to the lower plate and having a peripheral ring wall with a longitudinal axis perpendicular to the upper and lower plates, a ring plate coupled to an inner side of the ring wall and extending across the ring structure, and a contact member coupled to the ring plate and extending along the longitudinal axis of the ring structure to upperly contact a lower surface of the upper plate and to lowerly approach, without contacting, an upper surface of the lower plate, and further include one or more sensors coupled to the ring plate that measure a deformation of the ring plate upon application of a load on the upper surface of the upper plate.

The sensors may be strain gauges that measure a strain applied to the ring plate.

An automatic device for controlling the feeding of the load material or scrap metal according to the invention further includes connection and control systems for the means used to feed or load the load material or scrap. Basically, the automatic device or system for management and control, acquires a reading of the precise measurement supplied by the weighing device, differential over a period of time, which measures in a continuous manner the amount of load material or scrap metal added to the bath, by weighing the furnace shell, its contents and all components it may support.

According to the algorithms for optimizing the load flow, the automatic management and control system thus operates on the scrap metal feeding speed to prevent any solid agglomerates that form from being sent into the bath at any energy level whatsoever (electrical and/or chemical).

A main advantage of the equipment and method according to the present invention, is the fact that by controlling the ratio between the supplied energy and weight of loaded material (scrap), the temperature of the liquid metal can be controlled, maintaining it close to the ideal value for the cycle, and being able to operate constantly at the maximum energy yielded to the bath, and therefore contributing towards raising the productive efficiency.

Furthermore, this helps prevent any human errors caused by lack of precision in operating condition calculations.

Yet a further advantage is the reduction in requests for technical information from the head operator on the line, who will have the support of a system able to analyze conditions in real time and thus help him to make the appropriate decisions automatically and in real time.

As far as the weighing device is concerned, the solution adopted according to the present invention is particularly advantageous, as it is based on a choice of general furnace configuration derived from a well-tested design and constructive scheme, but with the addition of a data acquisition method that is absolutely innovative.

The constructive scheme of the proposed furnace is based on the separation of the various functions: the function of containing the smelted material requires a compact structure, as light as possible, comprised of only the furnace shell and any other components it may support. The support and tilting of the furnace shell (during tapping, the complete emptying of the furnace shell for maintenance or remaking) require a support structure from underneath. This configuration has been demonstrated as the most suitable for the application of the weighing system since it is that which provides the best ratio between treated material, in other words, the load material or scrap metal to be fed into the furnace, and the total weight applied on the weighing system.

In fact, in the solution according to the present invention, the furnace shell weighs on the support structure by means of the rollers or other different weighing devices, having the additional function is to recover any deviation in shape induced by the heat cycle. Such rollers or other different weighing devices support the structure involved in smelting as little as possible, and, therefore, are the best solution for providing efficient instrumentation aimed at monitoring the weight of the scrap metal to be added.

Given the geometry of the coupling between the furnace shell and the support structure however, other embodiments are possible, such as precision measuring systems to calculate the distance between the furnace shell body and the support structure or any furnace shell weighing system suitable for controlling scrap metal or load material feeding.

The equipment and method according to the present invention are also applicable to all operating methods that involve the addition of liquid or solid metal, in a more or less continuous manner during the operating cycle.

Although the particular equipment and method for the measuring and control of load material and scrap metal feeding into furnaces for steel production, is closely linked with the specific constructive scheme of the furnace shell, it can also be applied to other methods. It is another object of the present invention to provide a method for steel refining comprising:

continuous preheating of the load material;

feeding of said material containing iron, directly reduced iron, or a blend of both into an electric arc furnace in order to perform smelting and refining operations; —feeding of elements to form slag in the bath for steel production;

introduction of carburizing elements into the furnace for steel production;

electrical heating of the load using electrodes to melt the load and form a bath of melted metal in the furnace with a layer of melted slag on said melted metal bath;

maintaining said slag in a foamy condition during the steel production process; —feeding of metal elements, as slag formers, and carburizing elements into said furnace;

maintaining full electrical power capacity in said furnace for the total loading, smelting and refining time;

intermittent tapping from the furnace maintaining a liquid metal heel inside the furnace shell, said liquid metal heel approximately representing a weight that varies between 10% and 50% of the weight prior to tapping;

such method being characterized in that the load material or scrap metal feeding step, that is materials containing iron, directly reduced iron, or a blend of both, in an electric arc furnace, comprises the following sub-steps:

weighing of the load material or scrap metal added to the bath, supplied by a weighing device through the weighing of the furnace shell, its contents and any components it may support.

data acquisition of a measurement reading of the amount of load material or scrap metal added to the bath, and supplied by the weighing device, differential in time for example.

optimizing the load flow according to suitable algorithms through regulating the load material or scrap metal feeding speed, according to the energy supplied to the bath.

It is another object of the present invention to provide equipment for refining steel comprising:

an electric arc furnace for steel production, for smelting and refining a load of metal inside the furnace;

electrodes that extend inside the furnace as far as the intermediate slag level and the level of the smelted material contained in the bath;

a feeding means connected to said furnace for the introduction of load materials inside said furnace without the removal of the electrodes;

post-combustion means associated to cooperate with said feeding means in order to preheat the load materials inside said feeding means;

means for measuring and controlling load material or scrap metal feeding composed of an automatic control means for the load material or scrap metal, and a means for measuring the added load material, in correlation with the automatic control device;

a hermetically sealed mechanical device located in the inlet section of the load material or scrap metal to the feeding means;

gas injection means that communicate with said furnace above and/or below the normal melted metal level in the bath; and means for tilting said furnace for slagging and tapping operations, the tapping means being positioned in a manner so that said slant of said furnace will maintain a heel of melted liquid material inside said bath, said heel having a weight that varies approximately between 10% and 50% of the weight prior to tapping.

BRIEF DESCRIPTION OF THE DRAWINGS

The structural and functional characteristics of the present invention and its advantages in relation to prior technical art will be made clearer and more obvious from the following description, with reference to the appended drawings wherein:

FIGS. 3 and 4 are side elevation views of a system according to the present invention;

FIG. 5 is a block diagram of a method according to the present invention;

FIGS. 6A-6C are cross-sectional, front and top views of a system according to the invention;

FIGS. 7A-7B illustrate side views of the system of FIGS. 6A-6C in rest and deformed states;

FIGS. 8A-8C are cross-sectional, front and top views of a system according to the invention;

FIGS. 10A-10B illustrate the system of FIGS. 6A-6C and 8A-8C in rest and loaded conditions.

DETAILED DESCRIPTION OF EMBODIMENTS OF THE INVENTION

The term "load material" or "scrap metal" used in the present description and in the claims refers to the load material for continuous smelting, comprised of iron scrap, cast iron, directly reduced iron in the form of peens or fragments and/or a blend of both. In particular, the term "load material" includes scrap metal unless stated otherwise. In the present description and claims, the term "load material" is meant to include scrap metal unless stated otherwise.

Figure 1:
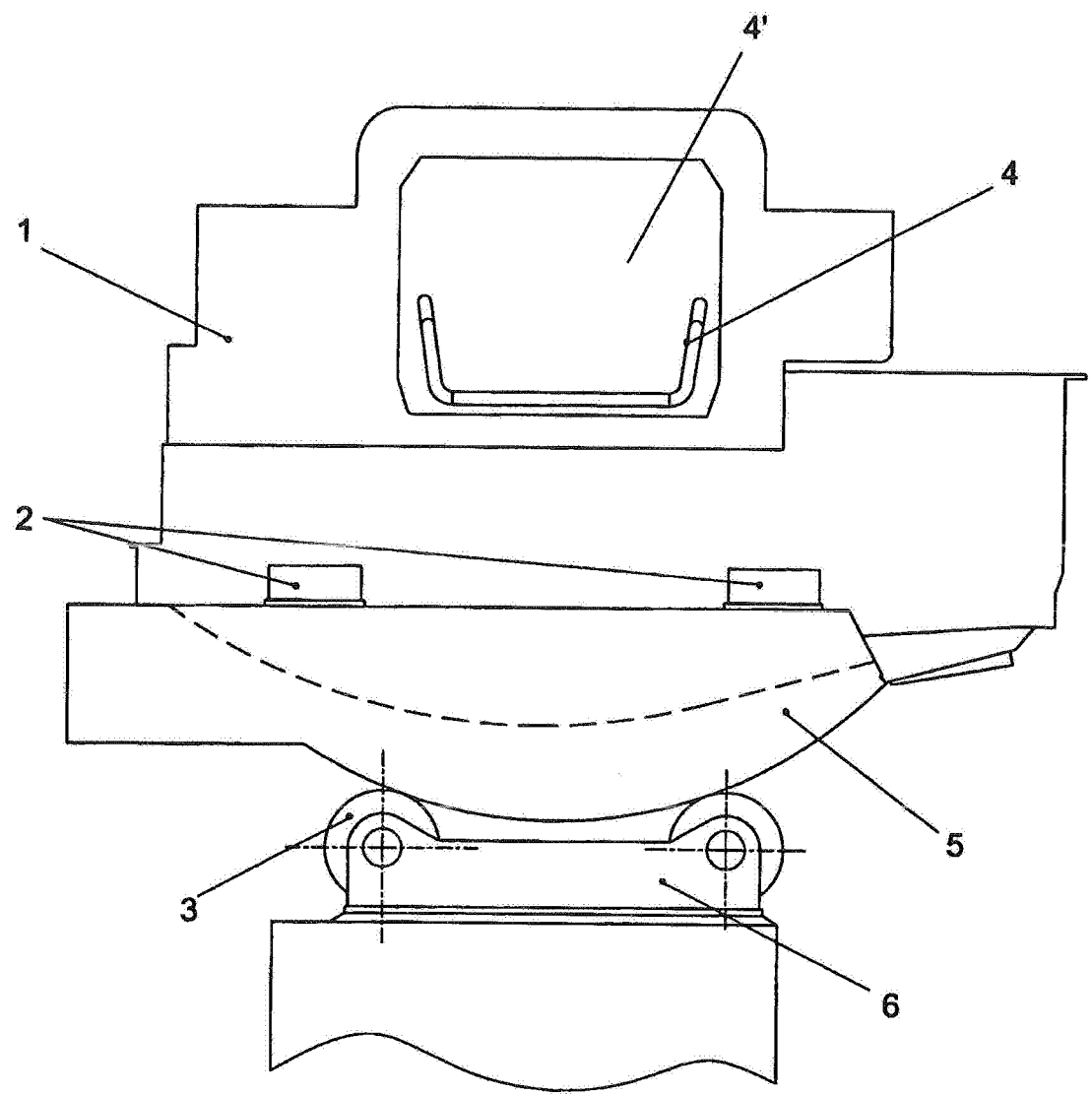
FIGS. 1 and 2 are side elevation views of technical solutions according to the state of the art.

FIG. 1 illustrates an electric arc furnace (EAF) supported by a tilting platform 5 (for slagging, tapping or emptying operations) having wheels 3 positioned on support bases 6.

The shell 1 of the EAF is set on the tilting platform 5 using suitable supports 2.

The side opening 4' of the EAF is used to feed the scrap metal, by means of a conveyor 4 if necessary, with a continuous feeding procedure such as that, for example in the Consteel® system. The traditional configuration is sometimes equipped with instruments for reading the weight by means of sensors located in the shafts of the EAF furnace support wheels 3.

FIGS. 3 and 4, instead, illustrate an embodiment of the present invention. Tilting platform 5 is mounted on support base 6, and furnace shell 1 is set on suitable supports 2 on platform 5. In order to allow for structural settling due to exposure to potentially high temperatures, the furnace shell support system includes at least two rollers 7. The weight readers or sensors are mounted inside rollers 7.

Purely as an example and without limitation, these sensors can be mounted with dual redundancy in the shafts of roller 7 and be shearing stress sensors. The weighed portion is composed of furnace shell 1 only, as shown in FIG. 3, which weighs much less than that shown in FIG. 1 (furnace shell 1 plus tilting platform 5). Therefore, the sensors in rollers 7, under less strain, can be designed to have far greater precision capability.

The data acquisition reading (see FIG. 5) together with a suitable calculation algorithm, enables step monitoring of the scrap metal feeding into furnace shell 1 in real time through opening 4' by means of the conveyor 4. The data acquisition system (FIG. 5) then processes that information, also according to the energy at the furnace inlet, making it available to line operator, as well as to continuous scrap metal feeding control system 4 as described in FIG. 5 (for example, like in the Consteel® system).

Figure 2:
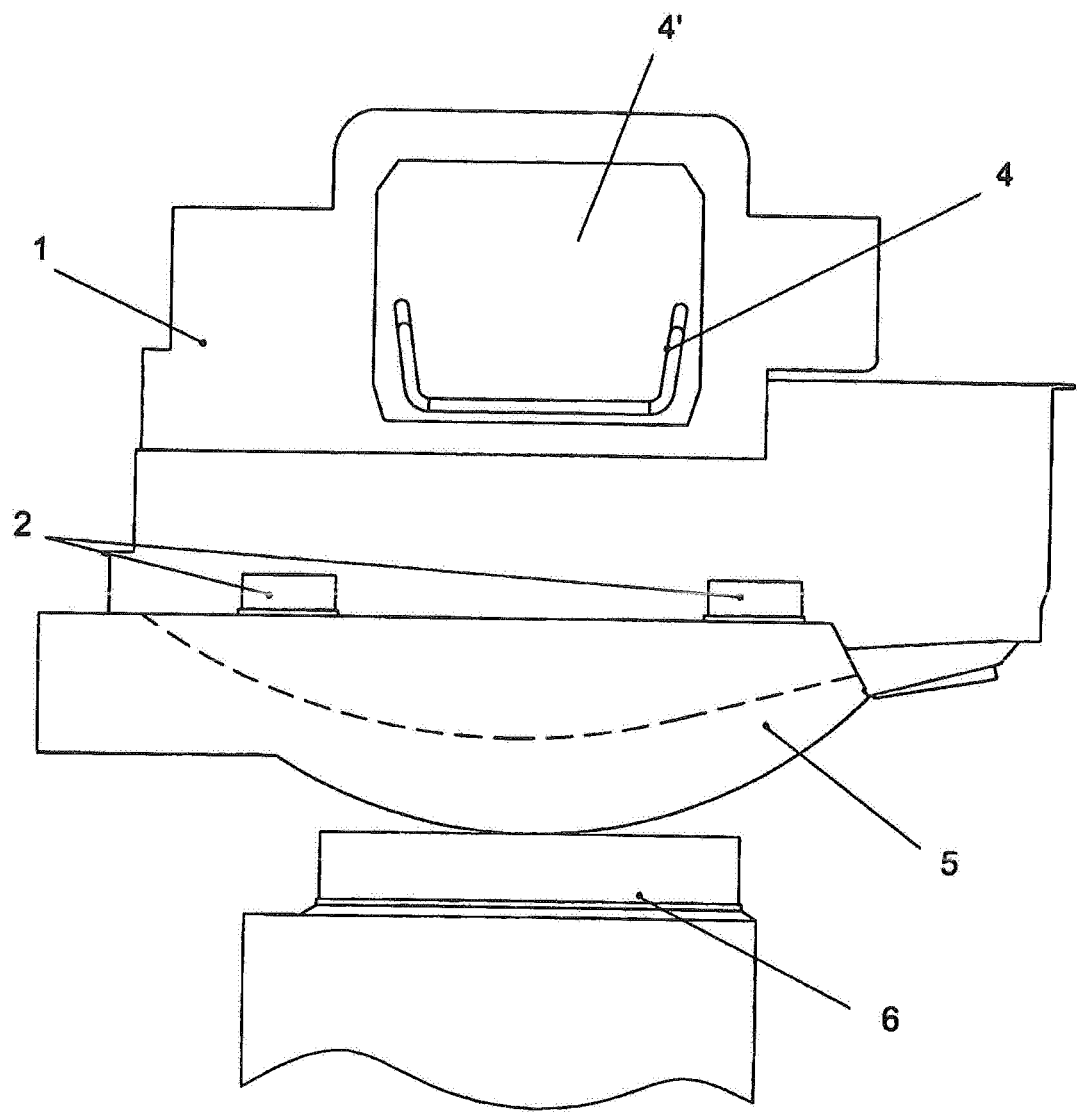

Alternatively, in the case of tilting furnaces without wheels (as in the type shown in FIG. 2 in the version according to present state of the art), which have weights that are not measured nearly as easily, the application of a solution according to the present invention enables real time measurement (FIG. 4) of the load material and has a considerable influence on the simplification of the construction of EAF systems with possible continuous feeding equipment (as in the Consteel® system, for example).

FIGS. 6-10 illustrate another embodiment of a measuring device according to the present invention.

As in the preceding embodiment, measuring device 10 operates as a load cell and is positioned between a shell 11 of an EAF and a tilting platform 12. In its essential elements, measuring device 10 includes an upper plate 13, which faces shell 11; a lower plate 14, which faces tilting platform 12; a ring structure 15, disposed therebetween and having a peripheral ring wall 16, a ring plate 17 subtended within ring wall 16, and a contact member 18 extending through ring plate 17; and one or more sensors 19 that measure a deformation of ring plate 17 when a load is applied upon contact member 18 by upper plate 13.

Upper plate 13 faces shell 11 and has an upper surface 20 that is adapted to slide against shell 11. In one embodiment, upper surface 20 is made from a wear-resistant material, such as Hardox® abrasion-resistant steel. Alternatively, the wear-resistant material can be applied on the bottom of shell 11, in the area facing and contacting upper surface 20. As another alternative, the wear-resistant material can be applied on both sides of the interface between the bottom of the furnace shell and the upper surface 20.

Lower plate 14, instead, is adapted to be fixedly engaged to tilting platform 12. In rest position, lower plate 12 is essentially parallel to upper plate 11 and, in one embodiment, may be engaged to lower plate 12 using bolts.

Ring structure 15 is disposed on lower plate 14 and may or may not be fixedly attached to lower plate 14. Ring structure 15 may have a variety of perimetral shapes, for example, may have a circular perimeter, providing ring structure 15 with a cylindrical shape.

Ring wall 16 has a longitudinal axis that is perpendicular to upper and lower plates 13, 14 and, on its inner side, supports ring plate 17 that is subtended across ring structure 15 in the guise of a diaphragm, preferably in a direction parallel to upper and lower plates 12 and 14. Ring plate 17 has a thickness that is lower than a height of ring wall 16 and is not necessarily subtended in a median position between the upper and lower ends of ring wall 16. In the illustrated embodiment, for example, ring plate 17 is subtended closer to the upper end of ring wall 16, at about ⅔ of the height of ring wall 16.

Contact member 18 extends along the longitudinal axis of ring structure 15 and has an upper end 21 that contacts the lower surface of upper plate 13, and a lower end 22 that, in rest position, is positioned at a distance from underlying lower plate 14. Such distance enables contact member 18 to move downward when ring plate 17 become deformed, as will be explained later. In the illustrated embodiment, contact member 18 is integral with ring plate 17, such that ring plate 17 defines a circular crown that connects ring wall 16 to contact member 18.

Upper end 21 of contact member 18 is preferably convex, so as to minimize contact surface between contact member 18 and upper plate 13 and enable a tilting motion of upper plate 13 in relation to contact member 18, as will also be explained later. Lower end 22 of contact member 18 instead has a flat shape, and acts as a travel limit in case of overload, limiting the deformation of the load cell and, therefore, preventing its rupture.

In the illustrated embodiment, there are four sensors 19 that are equally spaced on ring plate 17 around contact member 18. A person of skill in the art will appreciate that different numbers of sensor 19 may be used and that sensors 19 may be spaced at different distances as desired.

Sensors 19 measure the deformation of ring plate 17 when a load applied to upper end 21 of contact member 18 causes a downward pressure on contact member 18. In one embodiment, sensors 19 are strain gauges that measure the strain applied to ring plate 17.

Sensors 19 are connected to a data acquisition system that acquires readings of one or more measurements supplied by sensors 19.

A plurality of bars 23 connect upper plate 13 to lower plate 14 and are disposed on opposite sides of upper and lower plates 13 and 14. FIGS. 6A, 6B, and 6C depict an embodiment of the invention, in which two bars 23 and 24 are respectively provided on opposite sides of upper and lower plates 13, 14 and extend diagonally in opposite directions, so that bar 23 connects, on one side of measuring device 10, the upper "right" end of upper plate 13 with the lower "left" end of lower plate 14, and bar 24 connects, on the opposite side of measuring device 10, the upper "left" end of upper plate 13 with the lower "right" end of lower plate 14.

The purpose of bars 23 and 24 is not only to provide a connection between upper plate 13 and lower plate 14, but also to essentially eliminate the horizontal shear stress on measuring device 10 that runs parallel to upper and lower plates 13, 14. Further, bars 23 and 24 can accommodate small misalignments between shell 11 and tilting platform 12.

FIGS. 7A and 7B further illustrate how bars 23 and 24 enable small relative rotations between upper plate 13 and lower plate 14.

FIGS. 8A-8C illustrate an embodiment of the invention, in which there are three bars connecting upper plate 13 to lower plate 14 that are disposed in a step pattern on opposite sides of measuring device 10. Considering first the "left" side of measuring device 10, a first bar 25 extends downwardly for one end of upper plate 13 for about half of the distance between upper plate 13 and lower plate 14; a second bar 26 extends upwardly from an opposite end of lower plate 14 also for about half of the distance between upper plate 13 and lower plate 14; and a third bar 27 connects the lower end of first bar 25 to the upper end of second bar 26 in a direction parallel to upper and lower plates 13, 14. Three bars 28, 29, 30 also connect the opposing sides of upper and lower plates 13, 14 but in a mirror image pattern, so that, if lower plate 14 is square, then second bars 26 and 29 extend upwardly from lower plate 14 at diagonally opposite corners of lower plate 14.

Figure 9:
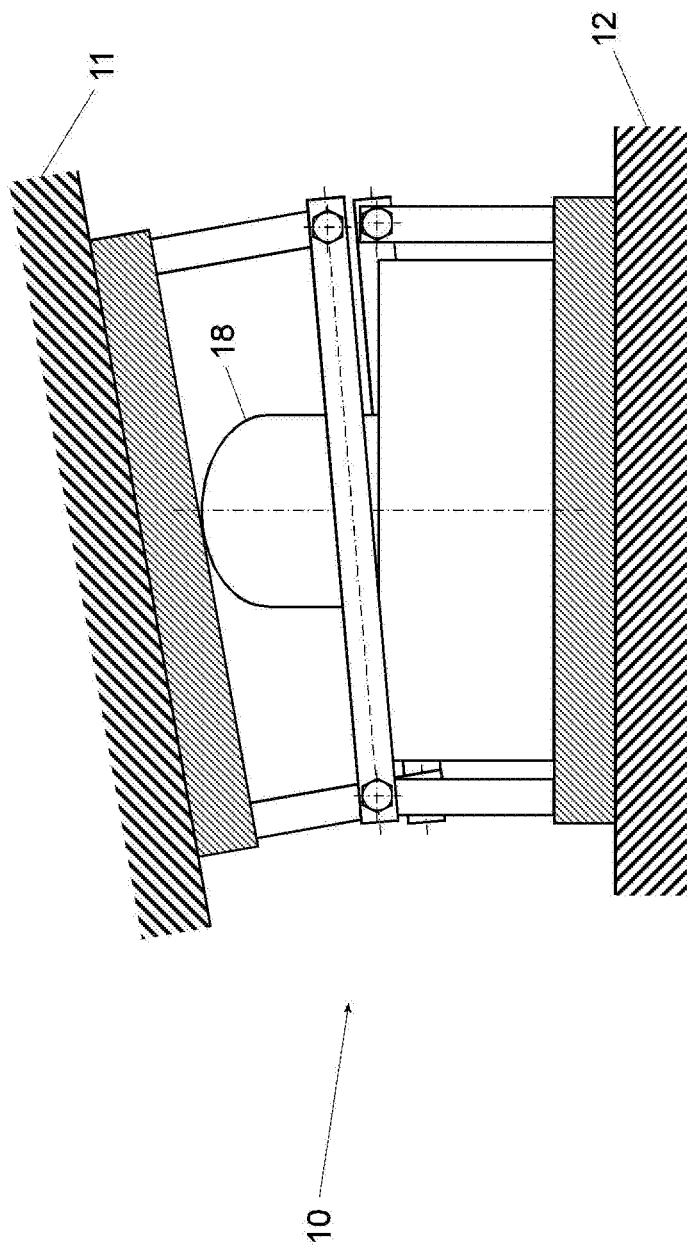
FIG. 9 illustrates a side view of the system of FIGS. 8A-8C in a deformed state.

FIG. 9 illustrates the deformation of measuring device 10 in the last described embodiment when shell 11 becomes misaligned in relation to tilting platform 12.

FIGS. 10A-10B illustrate a mode of operation of measuring device 10. As it can be seen, a downward pressure applied onto contact member 18 causes contact member 18 to translate downwardly toward lower plate 14, and also causes the circular crown defined by ring plate 17 between ring wall 16 and contact member 18 to deform in essentially conical fashion to accommodate such downward translation.

Like in the first embodiment, a system that includes measuring device 10 may further include a conveyor connected to the EAF that introduces a load material inside the EAF, and a post-combustion station cooperating with the conveyor that preheats the load materials inside the conveyor. An automatic control device may cause the load material to be fed into the EAF continuously.

Moreover, tilting platform 10 may be adapted to tilt the EAF for slagging and tapping operations, and be positioned such that a slant of the EAF maintains a heel of melted liquid material inside the EAF that has a weight between 10% and 50% of the weight before tapping.

It should be noted that data acquisition of measurement readings, using the above described equipment, of the amounts of load material or scrap metal added to the bath, possibly differentially in time enables a calculation of load flow optimization using suitable algorithms. Based on these data, equipment and systems according to the invention enable regulation of the load material or scrap metal feeding speed.

A measuring device configured as illustrated in FIGS. 6-10 offers several advantages, even over the measuring device illustrated in FIGS. 3 and 4. Some of these advantages can be summarized as follows:

Greater precision: While the measuring device depicted in FIGS. 3-4 provides precision levels in the order of 2%, the measuring device depicted in FIGS. 6-10 provides precision levels of 0.3-0.5% by providing more accurate readings of the bending deformation of the the circular crown defined by ring plate 17;

Easier maintenance: The measuring device depicted in FIGS. 3-4 may have a weight of a few hundred kilograms, including rollers and shafts, which makes it difficult for an operator to handle. The measuring device depicted in FIGS. 6-10 has a smaller volume, with a weight in the region of 10-20 kg, which can be handled by a single operator. This provides for an easier replacement, not only when the EAF is completely lifted for maintenance, but even without lifting the EAF by acting locally with a hydraulic lift or a jack to spread the facing surfaces of the upper and lower plates for a limited distance, in order to free and replace the measuring device;

Lower cost: The measuring device depicted in FIGS. 3-4 is not only heavier, but requires a larger number of machined components than the measuring device depicted in FIGS. 6-10, which has fewer mechanical parts and a lower weight, thereby reducing production costs.

While the invention has been described in connection with the above presented embodiments, it is not intended to limit the scope of the invention to the particular forms set forth, but on the contrary, it is intended to cover such alternatives, modifications, and equivalents as may be included within the scope of the invention. Further, the scope of the present invention fully encompasses other embodiments that may become obvious to those skilled in the art and the scope of the present invention is limited only by the appended claims.

The invention claimed is:

1. Equipment to measure and control a load material fed into an electrical arc furnace (EAF) that rests on a tilting platform, the equipment comprising:
  an automatic control device feeding the load material according to energy supplied to a bath; and
  a measuring device for the load material, operatively coupled to the automatic control device, the measuring device weighing a shell of the EAF, contents thereof, and any other components supported by the shell,
  wherein the measuring device is adapted to be positioned between the EAF and the tilting platform and comprises:
  an upper plate having an upper surface adapted to slide against a lower surface of the EAF;
  a lower plate having a lower surface adapted to be engaged to the tilting platform;
  a ring structure coupled to an upper surface of the lower plate and having,
    a peripheral ring wall with a longitudinal axis perpendicular to the upper and lower plates,
    a ring plate coupled to an inner side of the ring wall and extending across the ring structure, and
    a contact member coupled to the ring plate and extending along the longitudinal axis of the ring structure to upperly contact a lower surface of the upper plate and to lowerly approach, without contacting, an upper surface of the lower plate, and
  one or more sensors coupled to the ring plate and measuring a deformation of the ring plate upon application of a load on the upper surface of the upper plate.

2. The equipment according to claim 1, wherein the upper surface of the upper plate is made from abrasion-resistant steel.

3. The equipment according to claim 1, wherein the lower surface of the EAF, in contact with the upper surface of the upper plate, is made from abrasion-resistant steel.

4. The equipment according to claim 1, wherein the ring wall has a circular perimeter.

5. The equipment according to claim 1, wherein ring plate is parallel to the upper and lower plates and closer to an upper end of the ring wall than to a lower end of the ring wall.

6. The equipment according to claim 1, wherein the contact member has a convex upper end, thereby minimizing a contact area between the contact member and the upper plate.

7. The equipment according to claim 1, wherein the contact member has a flat lower end, acting as a travel limit in case of overload thereby preventing the rupture of the measuring device.

8. The equipment according to claim 1, wherein there is a plurality of sensors disposed on opposite sides of the contact member.

9. The equipment according to claim 1, wherein the one or more sensors are one or more strain gauges measuring a strain of the ring plate upon application of the load on the upper surface of the upper plate.

10. The equipment according to claim 1, further comprising a plurality of bars connecting the upper plate to the lower plate on facing opposing sides of the upper and lower plates.

11. The equipment according to claim 10, wherein the plurality of bars comprises two bars disposed diagonally in opposite directions.

12. The equipment according to claim 10, wherein the plurality of bars comprises, on each of the facing opposing sides of the upper and lower plates, three bars joined in a step pattern, the three bars comprising a first bar extending downwardly from a first lateral end the upper plate, a second bar extending upwardly from an opposite lateral end of the lower plate, and a third bar parallel to the upper and lower plates and connecting a lower end of the first bar and an upper end of the second bar.

13. The equipment according to claim 1, further comprises a data acquisition system of a reading of one or more measurements supplied by the one or more sensors.

14. The equipment according to claim 1, wherein the automatic control device is configured to feed the load material into the EAF continuously.

15. A system for refining steel, comprising:
  an electric arc furnace (EAF) producing steel by smelting and refining a load material inside the EAF;
  a conveyor connected to the EAF to introduce the load material inside the EAF;
  a post-combustion station cooperating with the conveyor and preheating the load materials inside the conveyor;
  a tilting platform for tilting the EAF for slagging and tapping operations, the tilting platform being positioned such that a slant of the EAF maintains a heel of melted liquid material inside the EAF, the heel having a weight that is between 10% and 50% of the weight prior to tapping; and
  equipment configured to measure and control feeding of the load material to the EAF, the equipment being positioned between the EAF and the tilting platform, the equipment comprising:
  an automatic control device feeding the load material according to energy supplied to a bath; and
  a measuring device for the load material, operatively coupled to the automatic control device, the measuring device weighing a shell of the EAF, contents thereof, and any other components supported by the shell,
  wherein the measuring device is positioned between the electric arc furnace and the tilting platform and comprises:
  an upper plate having an upper surface adapted to slide against a lower surface of the EAF;
  a lower plate having a lower surface adapted to be engaged to the tilting platform;
  a ring structure coupled to an upper surface of the lower plate and having,
    a peripheral ring wall with a longitudinal axis perpendicular to the upper and lower plates,
    a ring plate coupled to an inner side of the ring wall and extending across the ring structure, and
    a contact member coupled to the ring plate and extending along a longitudinal axis of the ring structure to upperly contact a lower surface of the upper plate and to lowerly approach, without contacting, an upper surface of the lower plate, and one or more sensors coupled to the ring plate and measuring a deformation of the ring plate upon application of a load on the upper surface of the upper plate.

16. The system according to claim 15, wherein the contact member has a convex upper end, thereby minimizing a contact area between the contact member and the upper plate, and a flat lower end, thereby maximizing a contact area between the contact member and the lower plate upon a downward deformation of the ring plate.

17. The system according to claim 15, further comprising a plurality of bars connecting the upper plate to the lower plate on facing opposing sides of the upper and lower plates.

18. The system according to claim 17, wherein the plurality of bars comprises two bars disposed diagonally in opposite directions.

19. The system according to claim 17, wherein the plurality of bars comprises, on each of the facing opposing sides of the upper and lower plates, three bars joined in a step pattern, the three bars comprising a first bar extending downwardly from a first lateral end the upper plate, a second bar extending upwardly from an opposite lateral end of the lower plate, and a third bar parallel to the upper and lower plates and connecting a lower end of the first bar and an upper end of the second bar.

\* \* \* \* \*